United States Patent [19]

Ludwig

[11] 4,048,268

[45] Sept. 13, 1977

[54] STABILIZATION METHOD

[75] Inventor: Nelson Henry Ludwig, Greenfield, Ind.

[73] Assignee: Eli Lilly and Company, Indianapolis, Ind.

[21] Appl. No.: 637,697

[22] Filed: Dec. 4, 1975

Related U.S. Application Data

[63] Continuation of Ser. No. 551,194, Feb. 19, 1975, abandoned.

[51] Int. Cl.² .............................................. B29C 17/14
[52] U.S. Cl. .................................... 264/15; 264/118; 264/141; 264/143; 424/120; 426/516; 426/518; 426/623; 426/636
[58] Field of Search ................................ 264/118–141, 264/142–143, 148, 15, 122, 124; 424/120; 426/516–518, 623–635, 636

[56] References Cited

U.S. PATENT DOCUMENTS

| 3,178,341 | 4/1965 | Hamill et al. | 424/120 |
| 3,438,780 | 4/1969 | Singer | 426/623 |
| 3,577,529 | 5/1971 | Pensack | 424/114 |
| 3,579,719 | 5/1971 | Moriya | 425/332 |
| 3,619,292 | 11/1971 | Brouillard et al. | 264/122 |
| 3,641,241 | 2/1972 | Davis et al. | 424/120 |
| 3,881,024 | 4/1975 | Pahoundis et al. | 426/578 |
| Re. 27,214 | 11/1971 | Nakahara | 425/222 |

OTHER PUBLICATIONS

"A New Technique for the Production of Spherical Particles," Reynolds, Mfg. Chemist & Aerosol News, 41, 40–43 (1970).

Preparation of Small Solid Pharmaceutical Spheres, Conine & Hadley, Drug and Cosmetic Industry, 106, 38–41 (1970).

Primary Examiner—Jeffery R. Thurlow
Attorney, Agent, or Firm—Dwight E. Morrison; Everet F. Smith

[57] ABSTRACT

A method of preparing an antibiotic composition which imparts stability to the antibiotic when used in an animal feed.

8 Claims, No Drawings

STABILIZATION METHOD

CROSS REFERENCE

This application is a continuation of my copending application Ser. No. 551,194, filed Feb. 19, 1975, now abandoned.

BACKGROUND OF THE INVENTION

1. Field of the Invention

This invention relates to a method of preparing an antibiotic composition which imparts stability to the antibiotic when used in an animal feed. This invention provides a method of preparation of particles of an antibiotic which particles are stable to the environment surrounding the antibiotic when it is incorporated in the animal feed.

2. Description of the Prior Art

A number of antibiotic materials are used in the treatment of animals for the control of infectious diseases, for improving the rate of growth of the animals, or for improving the utilization by the animals of the feed they ingest. Among the antibiotics used for these various purposes, there can be named tylosin.

Tylosin is a well-known agricultural antibiotic drug. It was first disclosed in Hamill et al., U.S. Pat. No. 3,178,341 (Apr. 13, 1965), which patent taught the production of tylosin by fermentation with microorganisms identified as NRRL 2702 and NRRL 2703, which are obtainable from the Northern Utilization Research and Development Branch, U.S. Department of Agriculture, Peoria, Ill. Tylosin is well known to be effective against staphylococcus, mycobacterium, klebsiella, streptococcus and diplococcus organisms.

The antibiotic, although useful in the treatment of these various diseases, and capable of being administered orally in the feed of animals, unfortunately is inclined to instability brought about by the co-ingredients which contact the antibiotic in the final feed mixed for administration to the animals, and therefore suffers a considerable loss of potency.

The period of time over which it is important to maintain the antibiotic in its stabilized condition, after mixing with the animal feed and until the consumption by the animals of the feed, is relatively short, varying from a few days to a few months, i.e., perhaps three months. Since the concentration of antibiotic required in the feed ration is extremely low, it is customary to supply the antibiotic in the form of a relatively concentrated premix of the antibiotic in an edible carrier. This premix is then blended with the desired animal ration and the mixture is then fed to the animals in meal form or in pelleted form.

Thus, for example, to protect the tylosin from deterioration when the tylosin is incorporated as a feed premix into an animal feed, gelatin has for some time been used to coat the tylosin particles. However, the current cost of gelatin and the growing scarcity of gelatin prompted research to discover other means of stabilizing the tylosin for use in the feed premixes and in the animal feeds.

Since a high percentage of the cattle, swine and poultry feed sold and used in the U.S.A. is in the pelleted form, and the antibiotic is less stable in the pelleted form of feed, it is important to find a way to make the antibiotic more stable under these conditions of use.

SUMMARY OF THE INVENTION

It has now been discovered that an antibiotic to be used in a feed premix can be stabilized by preparing an intimate admixture of the antibiotic with a diluent, a physiologically-acceptable binder, and water, extruding the intimate admixture through a perforated plate having relatively small apertures into elongated strands of extrudate, and contacting the elongated strands of extrudate with a moving frictional plate, imparting motion to said extrudate and developing a tumbling, rolling bed thereof wherein the strands are reduced to particles, called minigranules, and drying the thus formed particles or minigranules to remove excess moisture.

DESCRIPTION OF THE PREFERRED EMBODIMENTS

The present invention relates to a novel method for stabilizing an antibiotic used in an animal feed. More particularly, this invention relates to a method of stabilizing an antibiotic, such as tylosin, which comprises the steps of (A) intimately admixing said antibiotic with (1) a diluent selected from the group consisting of solvent-extracted soybean feed, alfalfa meal, soybean mill run, corn flour, milo flour, and wheat middlings, and (2) water; (B) blending the intimate admixture of (A) with (3) a physiologically-acceptable binder selected from the group consisting of starch, gelatin, polyvinylpyrrolidone, soy protein, cellulose, bentonite, acacia powder, and lignin sulfonate; (C) extruding the thus blended admixture under pressure through a perforated plate forming an extrudate of elongated strands having a length generally exceeding the cross-sectional dimension; (D) reducing the strands of extrudate into particles; and (E) removing the excess water from the particles (D), to form particles of the antibiotic composition, which particles are termed "minigranules".

The term "minigranules", as used in this application, is defined as the product obtained by forming a mixture comprising the antibiotic, a suitable diluent, and a suitable binder, granulating that mixture, followed by drying.

The term "feed premix", as used in the present application, is defined as the antibiotic, in the form of the minigranule mixed with a suitable edible carrier. The premix thus obtained is intended to be further diluted with the animal ration, and the feed mixture obtained then may be formed into pellets, if desired.

As pointed out above, the period of time over which it is important to maintain the antibiotic in its stabilized condition after mixing with feed is relatively short, varying from a few days to about three months. Normally, the feed premix, defined as above, is diluted with the animal ration and, if it is desired to do so, is then formed into pellets by standard pelleting techniques well known to those skilled in the animal feed preparation art. The pelleted feed is prepared by an animal feed processing company and after preparation is sold to the feedlot operator, dairyman, or the individual farmer. It is well known to those familiar with farm, dairy, and feedlot practices that the owners thereof buy prepared, that is, pelleted feed, in such quantities as will last only a relatively short time.

The antibiotic to be stabilized is suitably one which is useful in animals, including poultry, for the control of infectious diseases, for improving the rate of growth, or for improving the utilization of the feed the animals ingest. Antibiotics useful for such purposes include tylosin. The antibiotic, or its physiologically-acceptable salt, may be in dry form or in the form of an aqueous solution, suspension, or concentrate.

The diluent used in the first step of the stabilizing process can be, for example, a grain-based diluent such as solvent-extracted soybean feed, soybean mill run, corn flour, milo flour, wheat middlings, or a non-grain based diluent such as alfalfa meal. Preferred diluents for use in this novel process include solvent-extracted soybean feed, corn flour, and alfalfa meal, with the diluent of choice being solvent-extracted soybean feed. The diluent may be used in from about 50 to about 98 percent on a dry weight basis to form the admixture.

Physiologically-acceptable binders found useful in preparing the admixture include starch, gelatin, polyvinyl-pyrrolidone, soy protein, cellulose, bentonite, acacia powder and lignin sulfonate. Of these, starch is the binder of choice. The binder may be present in from about 1 to about 10 percent by weight of the admixture on a dry weight basis, preferably from about 3 to about 5 percent by weight on a dry weight basis.

Water is the solvent of choice to be used in preparing the admixture to be utilized in forming the extrudate. The extrudate in turn is formed into the particles of stabilized antibiotic.

The novel stabilized particles of this invention are referred to as minigranules and can contain from about 1 to about 40 percent by weight of the antibiotic. The minigranules prepared using solvent-extracted soybean feed and alfalfa, respectively, as diluents, contain from about 1 to about 40 percent by weight of the antibiotic. Those minigranules prepared using a diluent selected from the group consisting of corn flour, milo flour, soybean mill run, and wheat middlings, contain from about 1 to about 20 percent by weight of the antibiotic. These differences in percent weight content of antibiotic are due in part to the variation in ability of the diluents to absorb moisture and to thereby form a suitable admixture for processing through the extruder and hence to the forming of the minigranules from the strands of extrudate.

The novel stabilization process of this invention is carried out as described hereinbelow.

In step (A) of the process, the antibiotic, or a suitable physiologically-acceptable salt thereof, a suitable diluent, and some water, are blended together in a blender. Suitable type blenders include a ribbon blender, tumbling cone, twin shell blender, vertical mixer, paddle mixer, sigma arm mixer, pony mixer, or the like. Preferably, the mixing is done in a ribbon blender. Although unnecessary in production type equipment, it may be desirable in pilot plant equipment to empty the ribbon blender into a suitable container, and the sides, bottom and blades of the ribbon blender be scraped clean. All of the material is then returned to the blender for additional mixing. Thus, step (A) of the novel process is carried out by intimately blending a mixture comprising from about 1 to about 40 percent by weight on a dry weight basis of tylosin, about 50 to about 98 percent by weight on a dry weight basis of a diluent selected from the group described above, and water, to form an intimate admixture.

When step (A) is finished, that is, when the blending is adjudged to be complete, step (B) of the novel process is carried out. The binder, along with some water, is added to the admixture in the blender and mixing continued for as long a time as necessary to provide intimate mixing of the various components with one another. The amount of binder required is calculated on a dry weight basis and equals from about 1 to about 10 percent by weight, preferably from about 3 to about 5 percent by weight of the components of the product of step (A). It has been found that prolonged mixing does not adversely affect the properties of the material being blended for processing in the extruder, the next step in the process. At the conclusion of this mixing, the mixture appears as a wet but free-flowing particulate material which forms a dough when compressed. This wet but free-flowing particulate material may have an overall moisture content of from about 43 to about 50 percent by weight, most typically and preferably about 47 percent by weight.

The admixture prepared as described above is next introduced into an extruder. Extruders are well known to the art. Generally, the material to be extruded is fed into a hopper over one end of a rotating screw auger disposed in a cylinder. The screw auger transports the material to be extruded the length of the cylinder and discharges said material into an annular space defined on one or more sides by a perforated plate. The material is forced through the perforations of the plate by the pressure created by transporting more of said material into said annular space than can be confined therein. The faster the material accumulates in the annular space, the greater the pressure being exerted to force said material through the perforations in said plate. The elongated strands of extrudate thus formed are suitable for further processing into the stabilized antibiotic particles.

The screen or perforated plate through which the admixture is extruded suitably contains round perforations of from about 0.3 mm. to about 1.0 mm. in diameter. The perforation of choice is the 0.5 mm. perforation, since that size extrudate thereby lends itself to the production of minigranules which can be more uniformly dispersed in feed mixes at very low concentration.

The elongated strands of extrudate produced by the extruder will vary in length from something a little more than the cross sectional dimension to a measurement many times the breadth of said strand. The length of strands will vary with the relation of the perforated plate to the vertical. A plate set on the vertical will form strands having a shorter length than those coming from a plate facing down. Furthermore, the cross sectional dimension of the perforations also influences the length of the strands. In any event, the strands of extrudate do not tend to stick together under normal handling and can be spread on trays for drying or added directly to a particle-forming apparatus without encountering aggregation, agglomeration, coalescence, or disintegration.

When it is possible to remove the excess moisture from the strands of extrudate prior to forming the particles of stabilized antibiotic, it is preferred in the present process that such particles must be formed before the excess moisture is removed. The extrudate strands are therefore divided into particles, the length of which particles varies from about one to about five times their cross-sectional dimension.

The division of the extrudate strands into short lengths is accomplished by contacting the strands with a moving frictional plate, said plate being of either a flat or curved form and having either a smooth or serrated surface, preferably the latter, said frictional plate moving at a velocity sufficient to overcome the inertia of said extrudate. The moving frictional plate sets up a rolling, tumbling bed of extrudate and in such bed, the elongated strands are divided into particles of from about one to about five times their cross-sectional dimension in length. Illustrative of devices wherein this operation can be performed are: (a) coating pans used in pharmaceutical and confectionary industries and well known in the art, which pans can be operated satisfactorily whether set in a vertical plane or tilted at an angle; (b) granulating pans, also well known in the art, such as those used in pelletizing "taconite" iron ore for shipment and characterized by being of large diameter and with a relatibvely low integral circumferential side wall confining the particles on the flat surface (these pans are generally operated at a slight angle, perhaps 15° off the horizontal and are rotated slowly); (c) an apparatus for dividing wet plastic extrusions into short lengths, comprising a stationary vertical cylindrical container having a rotatable flat or outwardly curved circular frictional plate disposed therein, said plate being disposed on a shaft at approximately a right angle thereto, such device being the subject of U.S. Pat. No. RE27214, or U.S. Pat. No. 3,579,719.

Preferably, the extrudate reduction is accomplished using the device of (c) above by: (1) contacting said extrudate with a circular frictional plate mounted horizontally in a vertically disposed stationary cylindrical vessel; (2) rotating said plate at a speed sufficient to overcome the inertia of said extrudate; (3) imparting velocity to said extrudate such that said extrudate moves in a curved path toward the periphery of said plate; (4) establishing a moving doughnut-shaped ring of said extrudate; and (5) continuing such movement until said extrudate is reduced to particles of from about one to five times their cross-sectional dimension in length. The circular frictional plate is suitably operated at speeds ranging from 1200 to about 1800 rpm.

The final step in the novel method of this invention comprises drying the particles produced by the previous step until the particles, or minigranules, contain from about 5 to about 12 percent, preferably about 10 percent of residual moisture. The drying operation can be suitably accomplished by spreading said particles on trays and air drying at room temperature; by kiln drying at temperatures up to about 70° C.; or by loading said particles into a fluidized-bed dryer and blowing warm (approximately 70° C.) dry air through the fluidized bed of said particles, this latter being the method preferred for drying the particles obtained in the previous step of the present novel stabilization process.

The minigranules containing tylosin possess excellent stability properties. Such stability is comparable to or better than that effected by the use of gelatin for coating the tylosin particles.

This invention is further illustrated by the following examples.

EXAMPLE 1

Finely ground solvent-extracted soybean feed (diluent), 22.13 kg., was charged into a four cubic-foot ribbon mixer. A solution of 20.38 kg. of tylosin phosphate concentrate in 7.03 l. of water was distributed over the solvent-extracted soybean feed and the mixer was run for about 10 minutes. The mixer was emptied into a suitable container and the sides, bottom and blades of the mixer were scraped clean. (Probably unnecessary in production size equipment) All of the material was then returned to the mixer for an additional 10 minutes of mixing.

A binder was prepared by mixing 1.70 kg. of starch with 1.70 l. of water at room temperature and then adding 6.81 l. of boiling water while stirring. This procedure provided adequate and uniform hydrolysis of the starch. The hydrolyzed starch was then added to the material in the mixer, and 15 minutes of mixing was carried out. At the end of the mixing time, the mixture appeared as a wet but free-flowing particulate material which formed a dough when compressed. The mixture had an overall moisture content of about 47 percent.

Using an EXD-60 double screw extruder, this free-flowing particulate material was extruded through 0.5 mm. round perforations into elongated strands, the extruder being run at about 80 rpm. The extrusion proceeded at a rate of about 1.35 kg. per minute.

The elongated strands of extrudate were removed from the extruder and contacted with a circular frictional plate mounted horizontally in a vertically disposed stationary cylindrical vessel. The plate was rotated at a speed of about 1800 rpm., imparting a velocity to the extrudate sufficient to overcome the inertia of said extrudate and to establish a moving doughnut-shaped ring of said strands of extrudate. The rotational movement was continued for about 30 seconds, or until said strands of extrudate were divided into particles of from about one to about five times their cross-sectional dimension in length. The particles were then removed and dried in a continuous fluid-bed type dryer at a temperature of up to 70° C., over a period of about 15 minutes. The particles, or minigranules, after drying, had a moisture content of about 10 percent. These minigranules contained tylosin at the rate of 125 g. of tylosin per pound.

EXAMPLE 2

Into a small ribbon mixer was placed 349.3 g. of corn flour. To the corn flour was added a solution of 181.4 g. of tylosin phosphate concentrate to which 182 ml. of water had been added and the mixer was run for about 10 minutes. The mixer was emptied into a suitable container and the sides, bottom and blades of the mixer were scraped clean. All of the material was then returned to the mixer for an additional 10 minutes of mixing.

The binder was prepared by mixing 14 g. of starch with 14 ml. of water at room temperature and then adding 56 ml. of boiling water while stirring. The starch and water mixture prepared in this manner was added to the material in the mixer and an additional 15 minutes of mixing was carried out. As in Example 1, at this point, the mixture appeared as a wet but free flowing particulate material which formed a dough when compressed. It had an overall moisture content of about 47 percent.

This free flowing particulate material was extruded through 0.5 mm. round perforations into elongated strands, the extruder being operated at about 80 rpm. The extruder used was the model EXD-60 double screw extruder.

The elongated strands of extrudate were removed from the extruder and contacted with a circular frictional plate mounted horizontally in a vertically disposed stationary cylindrical vessel. The plate was rotated at a speed of about 1800 rpm., imparting a velocity to the extrudate sufficient to overcome the inertia of said extrudate and to establish a moving doughnut-shaped ring of said strands of extrudate. The rotational movement was continued for about 30 seconds or until said strands of extrudate were divided into particles of from about one to about five times their cross-sectional dimension in length. The particles were then removed and dried on a small fluid-bed dryer at about 50° C. for about 30 minutes. These particles, or minigranules, contained about 10 percent moisture after drying. The minigranules prepared using corn flour as a diluent contained tylosin at the rate of 80 g. of tylosin per pound.

Following the same general procedure as described in Example 2, and using the following quantities of ingredients:

394.7 g. diluent
90.7 g. tylosin phosphate concentrate
227.4 ml. water 14 g. starch
70 ml. water minigranules containing 40 g. tylosin per pound were prepared employing the following diluents:

2a. Soybean mill run. 40 g. tylosin/lb.
2b. Milo flour. 40 g. tylosin/lb.
2c. Alfalfa meal. 40 g. tylosin/lb.
2d. Wheat middlings. 40 g. tylosin/lb.

STABILITY STUDY

Studies were conducted to determine the stability of tylosin in an animal feed formulation, using samples obtained at the different steps of the preparation of the tylosin minigranules when solvent-extracted soybean feed was used as the diluent, as described in Example 1, supra.

Samples were collected (1) of the admixture from the mixer before the admixture was placed in the extruder, (2) of the extrudate from the extruder after extrusion, and (3) of the minigranules. Portions of all these samples were dried in a fluid-bed dryer and were broken lightly to provide material which would pass a 20 mesh sieve but which would be retained on an 80 mesh sieve. In addition, portions of the mixer sample, extruded sample, and the final minigranule sample were finely ground so that they would pass an 80 mesh sieve. All the above samples were mixed with a carrier, in this case soybean mill run, to provide premixes containing 40 g. of tylosin per pound. These premixes in turn were diluted with swine grower meal (SGM), a portion of each pelleted by methods well known to the feed industry art, and the stabilities of all the samples determined. Samples were held at 25° C. and at 37° C., respectively, for a period of three months in a temperature-controlled room. Each sample at each temperature was assayed at monthly intervals to determine the percent of the initial content of tylosin remaining in the sample. The procedure used in the assay was that described by H. S. Ragheb et al., *Jour. of the Assoc. of Official Analytical Chemists*, 56, 363–366 (1973).

The results of this stability study are reported in Table 1, which follows. In the table, column 1 identifies the sample; and columns 2 to 7, inclusive, the percent of initial tylosin content in each sample held at 25° C. or 37° C., respectively, as determined 1 month, 2 months, and 3 months from the beginning of the study.

Table 1 shows that tylosin, stabilized according to the novel process of this invention, incorporated into an animal ration which is pelleted, and the pelleted ration held at 37° C. for three months, retained about 75 percent of its antibiotic activity.

Table 1

Stability Assay Results
Percent of Initial Tylosin Content

|  | 1 mo. 25° | 1 mo. 37° | 2 mo. 25° | 2 mo. 37° | 3 mo. 25° | 3 mo. 37° |
|---|---|---|---|---|---|---|
| Minigranule premix + SGM | 90 | 95 | 103 | 103 | 90 | 92 |
| Same pelleted | 101 | 86 | 104 | 98 | 90 | 75 |
| Admixture premix + SGM | 96 | 93 | 108 | 105 | 90 | 90 |
| Same pelleted | 98 | 85 | 94 | 74 | 70 | 53 |
| Extrudate premix + SGM | 102 | 76 | 109 | 108 | 83 | 88 |
| Same pelleted | 92 | 86 | 109 | 90 | 92 | 64 |
| Minigranules ground to <80-mesh premix + SGM | 95 | 92 | 100 | 87 | 93 | 69 |
| Same pelleted | 77 | 55 | 82 | 46 | 61 | 37 |
| Admixture ground to <80-mesh premix + SGM | 100 | 99 | 104 | 101 | 94 | 84 |
| Same pelleted | 89 | 61 | 77 | 50 | 60 | 32 |
| Extrudate ground to <80-mesh premix + SGM | 94 | 79 | 103 | 77 | 83 | 61 |
| Same pelleted | 81 | 60 | 80 | 54 | 63 | 34 |

The stability of the tylosin in pelleted animal feed formulations containing the minigranules prepared according to Examples 2 through 2d, inclusive, when the feed formulations were stored at 37° C. for a total of three months, was determined according to the general procedure described hereinabove. The results are recorded in Table 2, which follows. In the table, column 1 identifies the diluent used; column 2, the percent of initial tylosin content in each sample held for 1 month; column 3, the percent of initial tylosin content in each sample held for 2 months; and column 4, the percent of initial tylosin content in each sample held for 3 months, all at 37° C.

Table 2

Stability Assay Results
% of Initial Tylosin Content

| Diluent | 1 Mo. | 2 Mos. | 3 Mos. |
|---|---|---|---|
| Soybean mill run | 90% | 91% | 65% |
| Corn flour | 98 | 96 | 81 |
| Milo flour | 89 | 82 | 66 |
| Alfalfa meal | 84 | 96 | 66 |
| Wheat middlings | 84 | 74 | 45 |

Table 2 shows that when tylosin minigranules were prepared using five different diluents, the minigranules dispersed into animal rations, followed by conversion of the minigranule-containing rations to pellets, good stability of the tylosin was generally attained.

I claim:

1. The method of stabilizing the antibiotic tylosin for use in an animal feed premix and in animal feeds, which method comprises the steps of:
    A. intimately blending a mixture comprising from about 1 to about 40 percent on a dry weight basis of the antibiotic, about 50 to about 98 percent on a dry weight basis of a finely ground diluent selected from the group consisting of solvent-extracted soybean feed and alfalfa meal, with water, or intimately blending a mixture comprising from about 1 to about 20 percent on a dry weight basis of the antibiotic, about 50 to about 98 percent on a dry weight basis of a finely ground diluent selected from the group consisting of soybean mill run, milo flour, wheat middlings, and corn flour, with water, to form an intimate admixture;

B. blending the intimate admixture (A) with a physiologically-acceptable binder selected from the group consisting of hydrolyzed starch, gelatin, polyvinylpyrrolidone, soy protein, cellulose, bentonite, acacia powder, and lignin sulfonate, the binder amounting to from about 1 to about 10 percent of the weight of the components of step (A), to produce a wet but freeflowing particulate material;

C. extruding the blend of (B) under pressure through round perforations of from about 0.3 mm. to about 1.0 mm. in diameter, forming an extrudate of elongated strands having a length generally exceeding the cross-sectional dimension;

D. reducing the strands of extrudate (C) into particles of from about one to about five times their cross-sectional dimension in length; and E. drying the particles from (D) at a temperature ranging from about room temperature to about 70° C. to a residual moisture content of from about 5 to about 12 percent.

2. The method of claim 1 wherein the diluent is solvent-extracted soybean feed.

3. The method of claim 1 wherein the diluent is alfalfa meal.

4. The method of claim 1 wherein the diluent is corn flour.

5. The method of claim 1 wherein the diluent is soybean mill run.

6. The method of claim 1 wherein the binder is hydrolyzed starch.

7. The method of claim 1 wherein the perforations of the extruder have a diameter of 0.5 mm.

8. The method of claim 1 wherein the reduction of the strands of extrudate into particles is accomplished by contacting said extrudate with a circular frictional plate mounted horizontally in a vertically disposed stationary cylindrical vessel; rotating said plate at a speed of from about 1200 to about 1800 rpm. to overcome the inertia of said extrudate; imparting velocity to said extrudate such that said extrudate moves in a curved path toward the periphery of said plate; establishing a moving doughnut-shaped ring of said extrudate; and continuing such movement until such extrudate is reduced to particles of from about one to about five times their cross-sectional dimension in length.

* * * * *